3,621,829
MASONRY CUTTING APPARATUS
Werner A. Maluck, Littleton, Colo., assignor to Christensen Diamond Products Company, Salt Lake City, Utah
Filed Apr. 23, 1969, Ser. No. 818,513
Int. Cl. B28d 1/04
U.S. Cl. 125—13 R                        15 Claims

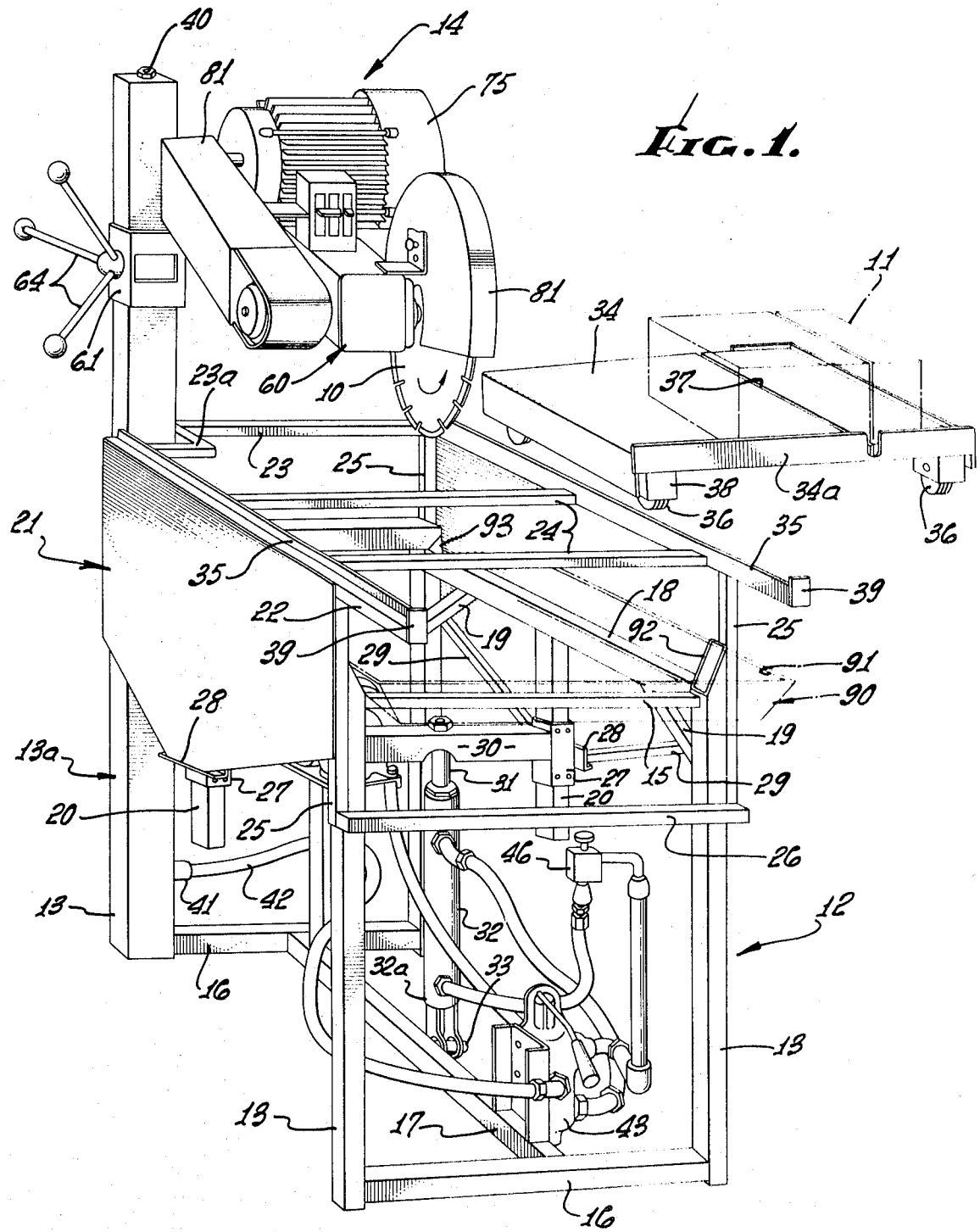

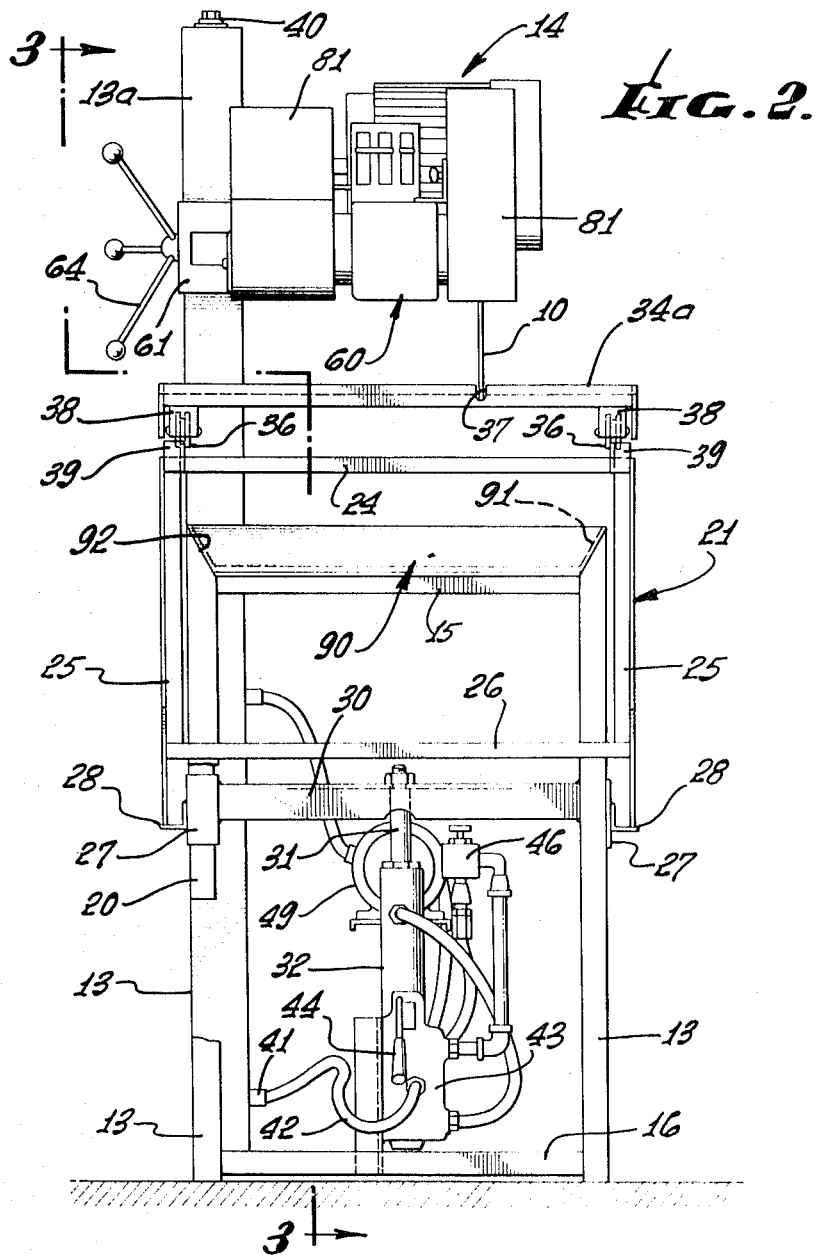

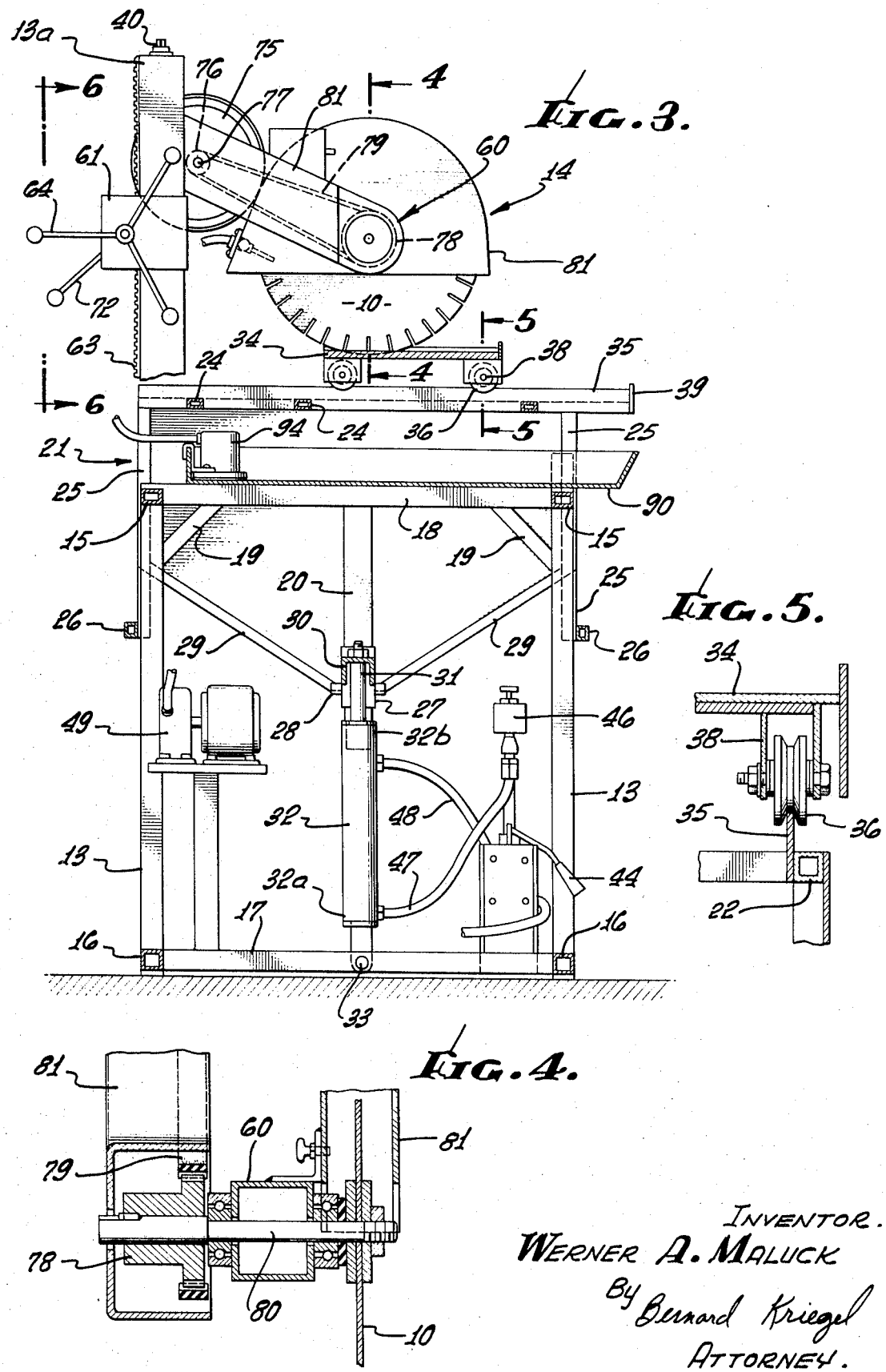

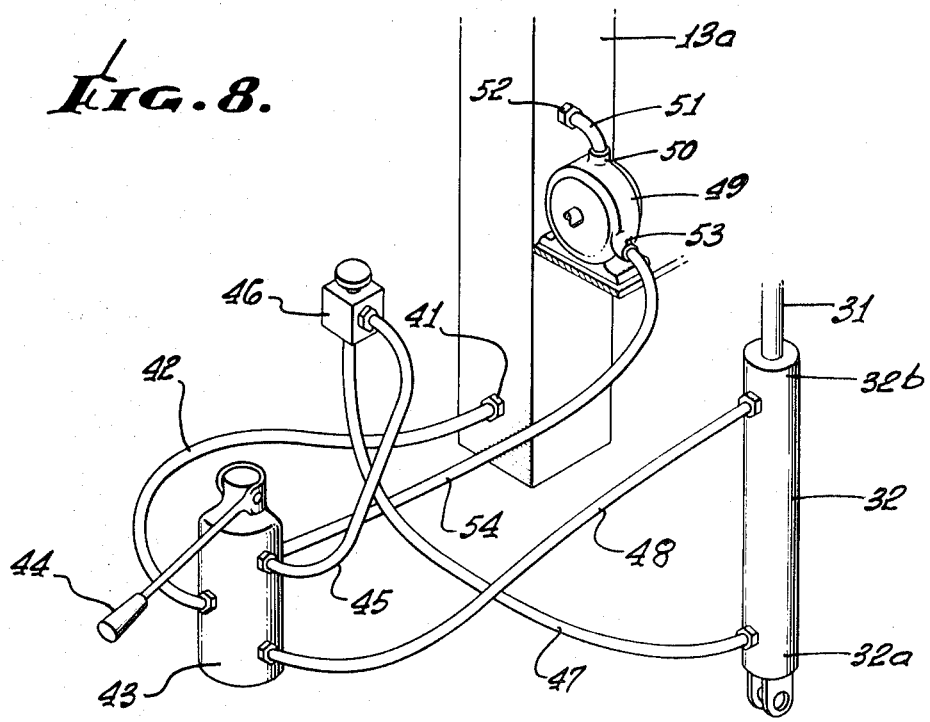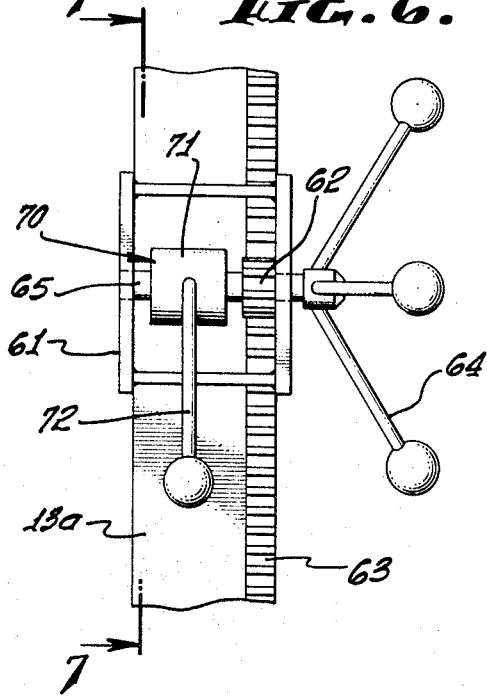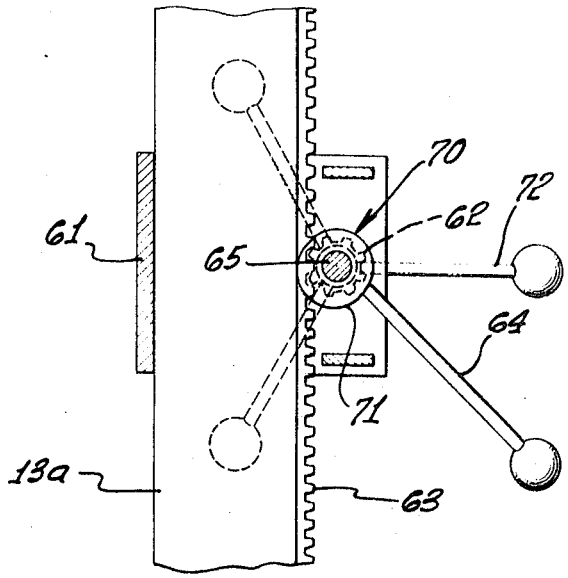

ABSTRACT OF THE DISCLOSURE

An adjustable power driven saw blade is fixed for rotation in a selected position by bodily shifting an entire rigid saw assembly. A work carrying table assembly located below the saw is hydraulically adjustable vertically between limits, and is fixed in adjusted position, the vertical movement of the table assembly, in being shifted relative to the saw blade, being in a straight vertical line.

---

The present invention relates to material sawing or milling apparatus, and more particularly to apparatus for cutting brick, refractories, stone, and other lapideous materials.

In circular cut-off saws or milling devices, such as brick and stone cutting machines, the brick or stone is clamped on a table which is shifted under a rotating circular cut-off saw. Heretofore, cut-off saws in general use have been pivoted to permit the axis of the saw to be adjusted vertically, depending upon the depth of cut required in the brick or stone. Once the depth of cut has been determined, the axis of rotation of the saw is fixed, and it will perform its cut as a result of moving the table carrying the brick or stone under it.

With the arrangement just described, the entire drive mechanism and the rotatable saw are carried on the pivoted arm which is shifted to determine the depth of cut, whereupon the arm is locked in place. Since the arm carries the entire drive mechanism, it is subject to inadvertent vibration and movement, and sometimes does not remain in a fixed position. As a result, the depth of cut might be other than desired, the mechanism itself being rather limber, which is an undesirable condition.

By virtue of the present invention, a pivoted or swing arm is not used. The axis of the circular saw can be adjusted depending upon the diameter of the saw used, but once adjusted it remains fixed. The drive mechanism for the circular saw is carried on a rigid immobile frame, which is not subject to vibration or movement and in which assurance is had that the axis of the circular saw will remain in a fixed position. The depth of cut in the work is determined by hydraulically moving a table truly vertically, to which the work, such as brick or stone, is clamped, the table support then being locked in the vertically adjusted position. However, the work carrying portion of the table is still shiftable horizontally on the frame of the table assembly under the rotating circular saw in the performance of the cut in the work.

The masonry cutting apparatus has great rigidity, as noted above, it is of relatively light weight, compact, and easy to operate. The work carrying table is shifted in a straight line to the desired setting. Within the limits of adjustment of the table assembly, an infinite range of settings can be secured. Once the table has been adjusted, it is securely locked in position so that the depth of cut is, thereafter, maintained constant. As a result, the cutting apparatus has great accuracy and high cut reproducibiltiy in the work.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understod that such detailed description is not to be taken in a limiting sense.

Referring to the drawings:

FIG. 1 is an isometric, partly exploded view of an apparatus embodying the invention;

FIG. 2 is a front elevation, with parts broken away, of the apparatus disclosed in FIG. 1;

FIG. 3 is a vertical section taken along the line 3—3 on FIG. 2;

FIG. 4 is an enlarged section taken along the line 4—4 on FIG. 3;

FIG. 5 is an enlarged section taken along the line 5—5 on FIG. 3;

FIG. 6 is an enlarged section taken along the line 6—6 on FIG. 3;

FIG. 7 is a section taken along the line 7—7 on FIG. 6; and

FIG. 8 is an isometric view illustrating the hydraulic system of the apparatus.

The apparatus illustrated in the drawings includes a circular saw 10 for effecting cuts in masonry and refractory types of materials 11. It includes a main frame 12 having four vertical supporting legs 13 at its corner portions, one of the rear legs 13a being in the form of a box-like, hollow column enabling it to function as an oil reservoir, this leg extending vertically upwardly to a substantial height above the other legs for the purpose of adjustably supporting the rotatable saw assembly 14. Upper cross members 15 extend between and are suitably secured to the upper portions of the front legs and the upper portions of the rear legs, there being lower cross members 16 extending between and secured to the lower portions of the front legs and rear legs. A central longitudinal beam 17 extends between and is secured to the lower cross members 16.

The main frame also includes side members 18 extending between and secured to the upper portions of the front and rear legs 13, diagonal struts 19 also extending between the upper side members and legs to impart greater rigidity to the frame apparatus. The upper ends of vertical guide columns 20 are suitably secured to the upper side members 18 and depend therefrom, these guide columns insuring true vertical straight-line movement of a table assembly 21 which is to be adjusted vertically and retained in such adjusted position below and with respect to the saw assembly 14 thereabove.

The table assembly includes an upper structure embodying spaced horizontal side rails 22 extending from the rear of the frame 12 to a position beyond the front portion of the main frame. A cross member 23 extends between and is secured to the rear portions of the side rails, this cross member having a portion 23a fitting freely around the oil reservoir column 13a. Intermediate cross members 24 extend between and are suitably secured to the side rails 22. Depending front and rear legs 25 are also secured to the front and rear portions of the side rails and extend downwardly along the sides of the several legs 13 of the main frame of the apparatus. A cross member 26 is disposed forwardly of the front legs 13 and is secured to the lower ends of the table assembly legs 25.

The table assembly 21 is adjustable vertically along the main frame 12, being guided along the vertical guide columns 20. As disclosed, a box-shaped slide 27 encloses each column and is slidable therealong, this slide being secured to an angle iron 28 which is, in turn, attached to the lower ends of oppositely directed and upwardly inclined struts 29, the outer ends of which are secured to the depending table assembly legs 25 at each side of the frame 12. Extending between and secured to the slides 27 on opposite sides of the apparatus is a cross beam 30, the central part of which is attached to a vertical shaft or rod 31 extending into a hydraulic cylinder 32, the lower end of the cylinder being suitablly attached to the longitudinal frame member 17 by means of a pin 33. The shaft or rod has an appropriate piston (not shown) secured to its lower end slidably sealed against the inner wall of the cylinder 32.

By pumping fluid under pressure into the lower or head end 32a of the cylinder while allowing it to bleed from its rod end, the shaft 31 is elevated, and, through the cross beam 30 and guides 27 the table assembly 21 is elevated, as described hereinbelow. Pumping of fluid into the rod end of the cylinder while allowing it to bleed from the head end lowers the entire table assembly.

A table 34 is provided which is shiftable horizontally along tracks 35 secured to the side rails 22. This table carries peripherally, generally V-shaped grooved wheels 36 (FIG. 5) at its corner portions which ride along the rails or tracks 35 of the table assembly 21 therebelow, the upper surface of the table being horizontal so as to support the work 11 thereon in a horizontal position. If desired, the work can be placed against a vertical forward table limit flange 34a. The table 34 is shifted between the front and rear of the assembly 21 on the tracks 35 to cause the work to pass against the rotating saw blade 10 and effect the cut. The table assembly is adjustable vertically, such that the saw blade thereabove can completely sever the work on the table surface. For that purpose, the upper surface of the table has a groove 37 therein to permit free passage of the rim of the saw blade as the table is moved from front to rear in causing the saw blade to effect its cutting action on the work 11 mounted on the table. The rearward limited travel of the table 34 is determined by its engagement with the front face of the oil reservoir column 13a, its forward extent of travel being limited by engagement of depending wheel supporting brackets 38 on the table with upwardly directed stop eleemnts 39 secured to the ends of the side rails 22.

As noted above, elevation of the table and its lowering in a straight line are effected hydraulically. Oil is placed in the hollow reservoir frame leg 13a by opening a suitable filler plug 40, there being a lower connection 41 from the reservoir to which an oil return line 42 is secured, this return line running to a foot valve 43 having an operating lever 44. The foot valve is not disclosed in detail since it is a known valve mechanism. From the foot valve, a fluid line 45 runs to a control valve 46, and from this control valve a delivery line 47 runs to the head end 32a of the cylinder 32. Another line 48 extends from the rod end 32b of the cylinder to the foot valve 43. An electric motor operated pump 49 has its inlet 50 connected through tubing 51 to another fitting 52 extending from the oil reservoir 13a, the discharge end 53 from the pump being connected by means of tubing 54 to the foot valve 43.

The hydraulic arrangement is such that when the operating lever 44 is depressed fully and the control valve 46 is opened, the oil under pressure flows from the pump or pressure line 54, and through the delivery lines 45, 47 to the head end 32a of the cylinder, so as to raise the operating shaft 31, and through the cross beam 30 and the box slides 27 elevate the table assembly 21 along the guide columns 20. When the proper elevation has occurred, the control valve 46 is closed, thereby trapping fluid in the head end of the cylinder and locking the table assembly and table 34 in their position of vertical adjustment.

Normally, the operating lever or handle 44 on the foot valve is in its neutral position, and with the control valve 46 closed, the table elevation remains fixed, the oil merely being circulated from the pump 49 through its pressure line 54 and foot valve 43 back to the reservoir 13a through the line 42. In the event that the table assembly and table are to be lowered, the operating handle 44 is placed in its upper position, the control valve 46 being opened, which then allows oil to be pumped through the line 54, valve 43 and line 48 to the rod end 32b of the cylinder, oil flowing from the head end 32a of the cylinder through the lines 47, 45, and valve 43 into the line 42 leading to the reservoir 13a, so that the shaft 31 is shifted downwardly in the cylinder to move the table assembly 21 and table 34 downwardly. Such downward travel can be arrested at any desired elevation, depending upon the depth of cut desired, simply by closing the control valve 46 and placing the valve handle 44 in its neutral position.

Thus, it is apparent that elevation of the table is effected by pumping oil under pressure into the head end 32a of the cylinder, while its lowering is effected by pumping oil into the rod end 32b of the cylidner.

The saw blade assembly 14 includes a rigid frame 60 adjustably mounted for vertical movement along the upper portion of the oil reservoir column 13a. This frame includes a box portion 61 slidable along the column 13a and shiftable vertically therealong by rotating a pinion 62 which is in engagement with a vertical rack 63 affixed to the rear of the column. The pinion is rotated by one of a plurality of levers 64 secured to a shaft 65 to which the pinion is affixed, the shaft being rotatably mounted in the box portion 61. When the frame 60 has been adjusted to the desired position, usually determined by the diameter of the saw blade 10, it can be locked in such position by a cam lock device 70. The cam lock includes a cam or eccentric 71 rotatably mounted on the shaft 65 and turned thereon by a lever 72 to either jam the eccentric 71 against the rear surface of the column 13a, to lock the saw assembly 14 in vertical position, or release the eccentric from the rear column surface to permit the rack and pinion device 62–65 to adjust the assembly 14 vertically.

The saw blade assembly frame 60 carries a prime mover or motor 75, which has a sheave or pulley 76 affixed to its shaft 77, rotating another sheave or pulley 78 through an intervening belt 79, this sheave or pulley 78 rotating a shaft 80 suitably rotatably mounted in the end portion of the frame 60 and secured to the saw blade 10 disposed above the table. Appropriate guards 81 protect the upper portion of the saw blade and also the sheave and pulley assembly.

The saw blade assembly 14 is adjusted vertically depending upon the diameter of the saw blade 10 being used. Once adjusted, through appropriate turning of the pinion 62 and its engagement with the stationary rack 63, it is locked and retained in such adjusted position. The table assembly is 21 adjusted vertically depending upon the size of the block of material 11 resting on the table 34 and the depth of cut desired, which is usually a cutting depth completely through the work, the table itself occupying a horizontal position in which the lower edge of the saw blade 10 extends below the upper surface of the table and passing through the table groove 37 as the table is moved from front to rear on the frame rails 35 and toward the stop surface on the reservoir column 13a. Once the table elevation has been selected and obtained by depressing the lever 44 and opening the valve 46, it remains hydraulically locked in that selected position by the closing of the control valve 46.

Because of the apparatus illustrated and described, the table assembly 21 is locked in a selected position of adjustment and is held rigidly in such position of adjustment, being shiftable vertically along a straight line. The vertical adjustment of the table is provided by power, which permits the table 34 to be lowered substantially and for the purpose of facilitating placement and removal of the work 11 onto and from the table, thereby greatly reducing operator fatigue. In addition, the work is cut simply by moving the table 34 from font to rear of the apparatus, there being no necessity for the operator to move the saw itself through the work. Since the saw assembly 14 is rigidly fixed for any position of adjustment, the saw 10 runs in a true vertical plane and does not tend to deviate from such plane, thereby providing greater saw accuracy and cut reproducibility than was heretofore obtainable. Infinite positions of adjustment of the table 34 can be made within the vertical limits of operation of the hydraulic mechanism, simply by locking the table in any selected position through the closing of the control valve 46.

The apparatus is specifically designed for wet orthogonal cutting of the material 11 on the table 34. For this purpose, a water pan 90 is supported on the main frame. This water pan has tapered sides 91 which are carried by the main frame 12. As disclosed, the forward portion of the water pan rests upon the upper inclined ends 92 of the front legs 13, the degree of inclination of such legs conforming to the tapered sides 91. In the rear portion of the frame, tapered blocks 93 are secured on which the rear side parts of the water pan rest Water is pumped from the pan 90 against the saw blade 10 and the work 11 to flush the cuttings from the work region and to maintain the saw blade in a clean and cool position, the water and cuttings dropping down into the reservoir where the water is recirculated by a suitable pump 94 and water circulating system (not shown).

I claim:

1. In apparatus for cutting material: a main frame having spaced front vertical legs, spaced rear vertical legs, and a vertical guide at each side of said frame between a front leg and a rear leg; a cutting assembly secured to a rear portion of said frame and adapted for rotating cutting means secured thereto, said cutting assembly extending from said rear portion of said frame toward the front portion of said frame; a table structure below said cutting assembly and slidably mounted on said vertical guides for vertical adjustment in a straight-line path toward and from said cutting assembly; said table structure including upper horizontal guide rails at opposite sides of said structure; a table shiftable horizontally along said guide rails under said cutting assembly forwardly and rearwardly of said main frame; means for effecting vertical shifting of said table structure on said vertical guides; and means for locking said table structure in various positions of adjustment on said vertical guides.

2. In apparatus as defined in claim 1; said shifting means including cylinder and piston means connected to said table structure, and means for forcing fluid under pressure into said cylinder and piston means to elevate said table structure along said vertical guides.

3. In apparatus as defined in claim 1; said shifting means including cylinder and piston means connected to said table structure, and means for forcing fluid under pressure into said cylinder and piston means to elevate said table structure along said vertical guides; said locking means comprising a control valve for trapping fluid in said cylinder and piston means.

4. In apparatus as defined in claim 1; said shifting means including cylinder and piston means connected to said table structure, a pump, a fluid reservoir connected to said pump, a selector valve for conducting fluid from said pump to one end of said cylinder and piston means to elevate said table structure along said vertical guides or from said pump to said reservoir; said locking means comprising a control valve for trapping fluid in said cylinder and piston means.

5. In apparatus as defined in claim 1; said shifting means including cylinder and piston means connected to said table structure, a pump, a fluid reservoir connected to said pump, a selector valve for conducting fluid selectively from said pump to each end of said cylinder and piston means to elevate or lower said table structure along said vertical guides; said locking means comprising a control valve for trapping fluid in said cylinder and piston means.

6. In apparatus for cutting material; a main frame having vertical guides spaced horizontally from each other and disposed intermediate the front and rear of said frame; a cutting assembly secured to said frame and including a circular saw for cutting lapideous materials; a table structure below said cutting assembly and slidably mounted on said vertical guides for vertical adjustment in a straight-line path toward and from said cutting assembly; means for effecting vertical shifting of said table structure on said guides; and means for locking said table structure in various positions of adjustment on said guides; said table structure including a horizontal cross beam between said vertical guides and connected to slides on said guides; said shifting means including a vertical cylinder below said beam, a piston rod in said cylinder connected to said cross beam substantially at its midpoint, and means for forcing fluid under pressure into the lower end of said cylinder to elevate said table structure along said guides; said beam, guides, slides, piston rod and cylinder lying in a common vertical plane.

7. In apparatus as defined in claim 6; said fluid forcing means including horizontal cross beam connected to slides on said guides; said shifting means including a vertical cylinder below said beam, a piston rod in said cylinder connected to said fluid forcing means including a pump, a fluid reservoir connected to said pump, a selector valve for controlling fluid from said pump to the lower end of said cylinder to elevate said table structure along said guides or from said pump to said reservoir; said locking means comprising a control valve for trapping fluid in said cylinder.

8. In apparatus as defined in claim 6; said fluid forcing means including a pump, a fluid reservoir connected to said pump, a selector valve for controlling fluid from said pump to the lower end of said cylinder to elevate said table structure along said guides or from said pump to said reservoir; said locking means comprising a control valve for trapping fluid in said cylinder; said table structure including upper horizontal guide rails; and a table shiftable horizontally along said guide rails under said cutting assembly.

9. In apparatus as defined in claim 1; means for vertically adjusting said cutting assembly on said frame; and means for securing said cutting assembly to said frame in various positions of vertical adjustment.

10. In apparatus for cutting material: a main frame having vertical guides spaced horizontally from each other; a cutting assembly secured to said frame and adapted for rotating cutting means secured thereto; a table structure below said cutting assembly and slidably mounted on said vertical guides for vertical adjustment in a straight-line path toward and from said cutting assembly; means for effecting vertical shifting of said table structure on said guides; and means for locking said table structure in various positions of adjustment on said guides; said frame having a vertical rack thereon, a pinion rotatable on said cutting assembly and meshing with said rack for vertically adjusting said cutting assembly on said frame; and means for securing said cutting assembly to said frame in various positions of vertical adjustment.

11. In apparatus as defined in claim 1; said shifting means including cylinder and piston means connected to said table structure, a pump, a fluid reservoir connected to said pump, a selector valve for conducting fluid from said pump to one end of said cylinder and piston means to elevate said table structure along said guides or from said pump to said reservoir; said locking means comprising a control valve for trapping fluid in said cylinder and piston means; means for vertically adjusting said cutting asembly on said frame; and means for securing said cutting assembly to said frame in various positions of vertical adjustment.

12. In apparatus for cutting material: a main frame having vertical guides spaced horizontally from each other; a cutting assembly secured to said frame and adapted for rotating cutting means secured thereto; a table structure below said cutting assembly and slidably mounted on said vertical guides for vertical adjustment in a straight-line path toward and from said cutting assembly; means for effecting vertical shifting of said table structure on said guides; and means for locking said table structure in various positions of adjustment on said guides; said table structure including a horizontal cross beam between said vertical guides and connected to slides on said guides; said shifting means including a vertical cylinder below said beam, a piston rod in said cylinder connected to said cross beam substantially at its midpoint, and means for forcing fluid under pressure into the lower end of said cylinder to elevate said table structure along said guides; said frame having a vertical rack thereon; a pinion rotatable on said cutting assembly and meshing with said rack for vertically adjusting said cutting assembly on said frame; and means for securing said cutting assembly to said frame in various positions of vertical adjustment.

13. In apparatus for cutting material: a main frame having vertical guides spaced horizontally from each other; a cutting assembly secured to said frame and adapted for rotating cutting means secured thereto; a table structure below said cutting assembly and slidably mounted on said vertical guides for vertical adjustment in a straight-line path toward and from said cutting assembly; means for effecting vertical shifting of said table structure on said guides; and means for locking said table structure in various positions of adjustment on said guides; said table structure including a horizontal cross beam between said vertical guides and connected to slides on said guides; said shifting means including a vertical cylinder below said beam, a piston rod in said cylinder connected to said cross beam substantially at its midpoint, and means for forcing fluid under pressure into the lower end of said cylinder to elevate said table structure along said guides; said fluid forcing means including a pump, a fluid reservoir connected to said pump, a selector valve for controlling fluid from said pump to the lower end of said cylinder to elevate said table structure along said guides or from said pump to said reservoir; said locking means comprising a control valve for trapping fluid in said cylinder; said table structure including upper horizontal guide rails; a table shiftable horizontally along said guide rails under said cutting assembly; means for vertically adjusting said cutting assembly on said frame; and means for securing said cutting assembly to said frame in various positions of vertical adjustment.

14. In apparatus as defined in claim 12; said fluid forcing means including a pump, a fluid reservoir connected to said pump, a selector valve for controlling fluid from said pump to the lower end of said cylinder to elevate said table structure along said guides or from said pump to said reservoir; said locking means comprising a control valve for trapping fluid in said cylinder; said table structure including upper horizontal guide rails; a table shiftable horizontally along said guide rails under said cutting assembly.

15. In apparatus as defined in claim 12; said table structure including a horizontal cross beam connected to slides on said guides; said shifting means including a vertical cylinder below said beam, a piston rod in said cylinder connected to said cross beam substantially at its midpoint, a pump, a fluid reservoir connected to said pump, a selector valve for controlling fluid from said pump to the lower end of said cylinder to elevate said table structure along said guides or from said pump to said reservoir; said locking means comprising a control valve for trapping fluid in said cylinder; said table structure including upper horizontal guide rails; a table shiftable horizontally along said guide rails under said cutting assembly; and a water pan supported by said frame under said table.

References Cited
UNITED STATES PATENTS

| | | | |
|---|---|---|---|
| 2,502,043 | 3/1950 | Howard | 125—14 X |
| 1,995,638 | 3/1935 | Ferris | 51—233 X |
| 2,716,402 | 8/1955 | Harrison | 125—13 |
| 2,377,437 | 6/1945 | Martin | 125—13 |

HAROLD D. WHITEHEAD, Primary Examiner

PO-1050
(5/69)

UNITED STATES PATENT OFFICE
CERTIFICATE OF CORRECTION

Patent No. 3,621,829  Dated November 23, 1971

Inventor(s) WERNER A. MALUCK

It is certified that error appears in the above-identified patent and that said Letters Patent are hereby corrected as shown below:

Column 6, lines 19 to 22, cancel "horizontal cross beam connected to slides on said guides; said shifting means including a vertical cylinder below said beam, a piston rod in said cylinder connected to said fluid forcing means including".

Column 8, lines 17 to 22, cancel "said table structure including a horizontal cross beam connected to slides on said guides; said shifting means including a vertical cylinder below said beam, a piston rod in said cylinder connected to said cross beam substantially at its midpoint," and substitute --said fluid forcing means including--.

Signed and sealed this 12th day of September 1972.

(SEAL)
Attest:

EDWARD M. FLETCHER, JR.
Attesting Officer

ROBERT GOTTSCHALK
Commissioner of Patents